Sept. 14, 1926.
S. B. STEWART
BULL HOOK
Filed May 20, 1926
1,599,727
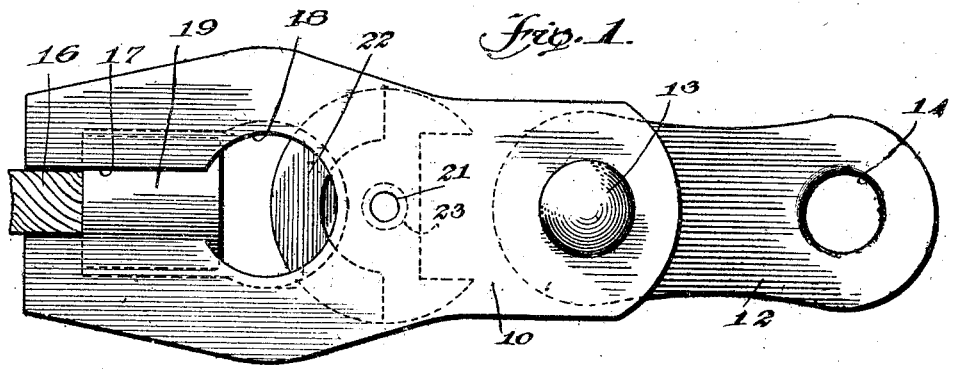
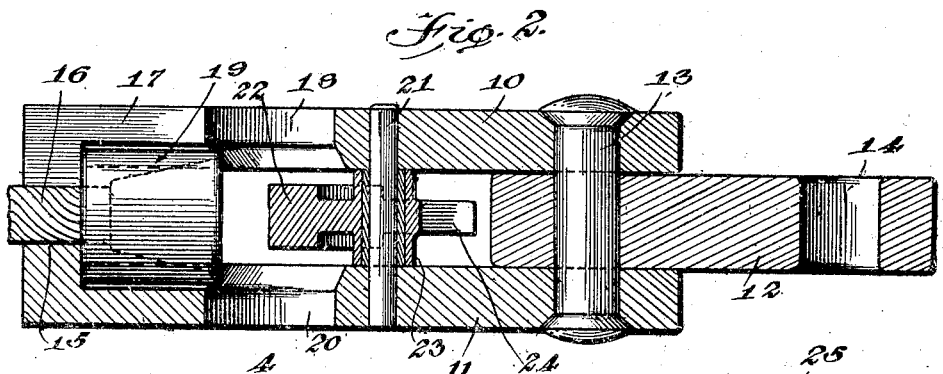
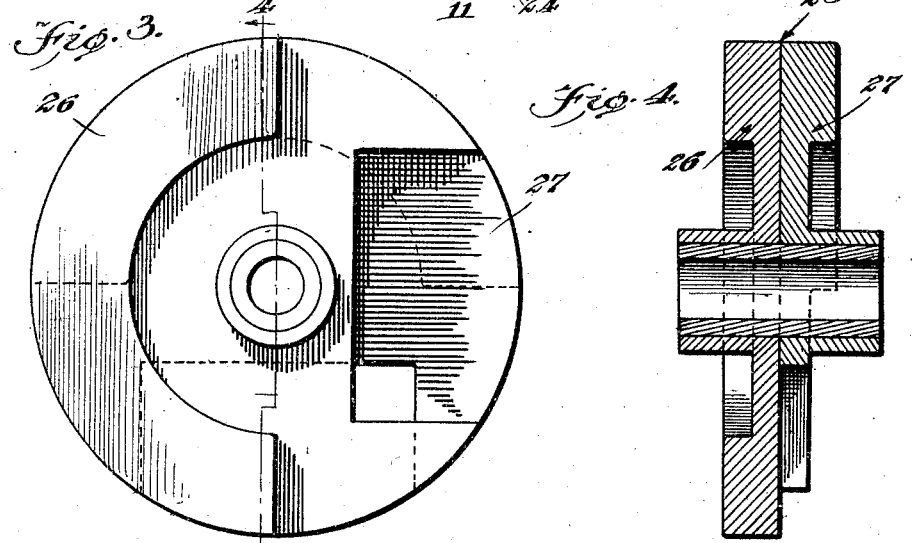
WITNESSES
INVENTOR
S. B. Stewart,
BY
ATTORNEYS Patented Sept. 14, 1926.

1,599,727

UNITED STATES PATENT OFFICE.

STANLEY B. STEWART, OF CENTRALIA, WASHINGTON.

BULL HOOK.

Application filed May 20, 1926. Serial No. 110,556.

My present invention relates generally to logging apparatus, and more particularly to what is known as a bull or butt hook, a device permitting of readily attachable and detachable connection of one end of a choker line with the hauling line or cable. Ordinarily the hauling line or cable carries the butt or bull hook at one end thereof and it is essential that the hook present means whereby one end of the choker line may be easily and quickly associated with and disassociated from the hook as well as means whereby the end of the choker line may be effectively held against accidental displacement while in association with the hook.

It is with the above in mind that my invention proposes a butt or bull hook having means therein adapted to automatically act to avoid danger of displacement of the engaged end of the choker line.

A further object is the provision of a hook having means for the above purpose, the nature of which is such as to interfere to a minimum extent only with the manual association of the choker line with the hook and its disassociation therefrom.

In the accompanying drawing which illustrates my present invention and forms a part of this specification:—

Figure 1 is a side view of my improved butt or bull hook;

Figure 2 is a central longitudinal section taken therethrough;

Figure 3 is a detail side view of the slightly modified form of locking counter-balance removed, and, Figure 4 is a sectional view through the modified locking counter-balance taken substantially on line 4—4 of Figure 3.

Referring now to these figures, and particularly to Figs. 1 and 2, my invention proposes a butt or bull hook including side plates 10 and 11 between which at one end of the hook the inner end of a link 12 is extended and pivotally supported by means of a cross pin 13, the outer or rear end of the link 12 having an eye 14 which receives one end of the hauling cable in practice.

At its opposite end the body of the hook made up of the connected side plates 10 and 11, has a central opening 15 through which the choker line passes, as indicated particularly at 16 in Fig. 2, and the side plate 10 has a longitudinal slot 17 between the end opening 15 of the hook and the side opening 18 in the side plate 10, through which the end knob 19 of the choker line 16 is introduced and removed. The side plate 11 has an opening 20 axially alined with the opening 18 and both plates have openings near to the openings 18 and 20, and in axial alinement to receive a fixed cross pin 21. Upon this cross pin within the space between the side plates 10 and 11, a bushed locking counter-balance 22 is freely rotatable. This counter-balance is generally of ring shape with its central hub portion 23 occupying practically the entire space between the side plates 10 and 11 and with one portion of its periphery provided with an enlarged recess 24 which when turned forwardly or in the direction of the seat of the knob 19 of the choker line, registers with the side openings 18 and 20, so that the end of the choker line with its knob 19 may be freely inserted in or removed from the hook. Opposite to its recess 24 the ring shaped counter balance is weighted as shown and extends to approximately the center of the side openings 18 and 20, so that the counter-balance in this, its normal position, constitutes a lock to prevent accidental displacement of the choker line knob 19.

As shown in Figs. 1 and 2, I contemplate a ring shaped counter-balance formed in one piece, but this construction may be varied to the extent illustrated in Figs. 3 and 4 where the counter balance 25 is in two oppositely facing similarly shaped sections 26 and 27, turned at 90 degrees with respect to one another and weighted to normally insure such relation between the sections, so that even in operations over rough ground where the jolting and jarring in action might have a tendency to shake and cause partial rotation of the locking counter-balance, there would be no danger of shifting of the counter-balance to a position where the knob 19 might accidentally displace from the body of the hook.

My invention thus provides a butt or bull hook which assures safety and which includes a locking member adapted to automatically shift into locking position in use, and which may at the same time be easily and quickly moved to released position so that there will be practically no delay over the ordinary construction in the insertion of the choker line knob within the hook and its removal therefrom.

I claim:—

1. A butt or bull hook having side and end openings and a slot between said openings, for the introduction and removal of a choker line and its knob, the said hook presenting a seat for a choker line knob therein around its end opening, and a locking member freely rotatable in the hook and normally presenting a portion thereof opposite the side opening, said member having a counter-weight normally holding the same in effective position and having a recess shiftable, by rotation of the member, opposite to the said side opening, for the purpose set forth.

2. A butt or bull hook having side and end openings, and a slot connecting said side and end openings to permit of the introduction and removal of a choker line and its knob, a cross pin within the hook adjacent to the side opening, and a ring shaped locking member freely revoluble on the said cross pin within the hook and having a counter weighted portion normally presented opposite a portion of the side opening to prevent displacement of a choker line knob from the hook, the said locking member having an enlarged recess diametrically opposed to its counter weighted portion and shiftable upon rotation of the locking member to a position opposite the side opening of the hook.

3. A butt or bull hook having side and end openings, and a slot connecting said side and end openings to permit of the introduction and removal of a choker line and its knob, a cross pin within the hook adjacent to the side opening, and a ring shaped locking member freely revoluble on the said cross pin within the hook and having a counter weighted portion normally presented opposite a portion of the side opening to prevent displacement of a choker line knob from the hook, the said locking member having an enlarged recess diametrically opposed to its counter weighted portion and shiftable upon rotation of the locking member to a position opposite the side opening of the hook, the said counter weighted locking member being in two similar side sections arranged to normally stand at approximately quarter-turned relation to one another.

STANLEY B. STEWART.